United States Patent [19]

Naslund et al.

[11] 4,203,255

[45] May 20, 1980

[54] FIRE-RESISTANT COMPOSITE WOOD STRUCTURE PARTICULARLY ADAPTED FOR USE IN FIRE DOORS

[75] Inventors: Edwin N. Naslund; Ian MacDonald, both of Santa Rosa, Calif.

[73] Assignee: Cal-Wood Door, Santa Rosa, Calif.

[21] Appl. No.: 931,259

[22] Filed: Aug. 4, 1978

Related U.S. Application Data

[63] Continuation-in-part of Ser. No. 800,785, May 26, 1977, Pat. No. 4,104,828.

[51] Int. Cl.² .......................... E04B 1/94; B27K 3/18
[52] U.S. Cl. .............................. 49/399; 428/45; 428/326; 428/921
[58] Field of Search .............. 49/504, 399; 428/298, 428/326, 402, 151; 241/28

[56] References Cited

U.S. PATENT DOCUMENTS

| | | | |
|---|---|---|---|
| 3,535,199 | 10/1970 | Kuhr | 428/326 |
| 3,887,415 | 6/1975 | Elmendorf | 428/326 |

*Primary Examiner*—John E. Murtagh
*Attorney, Agent, or Firm*—Limbach, Limbach & Sutton

[57] ABSTRACT

A composite wood material, specially adapted for use as part of a door with a long fire rating, comprising a board material made of wood chips and fire-retardant chemicals and one or more sheets of material of pressed wood fibers with a fire retardant added thereto, designed to optimize resistance to penetration by fire, increase screw holding ability, resist splitting and minimize cost.

9 Claims, 11 Drawing Figures

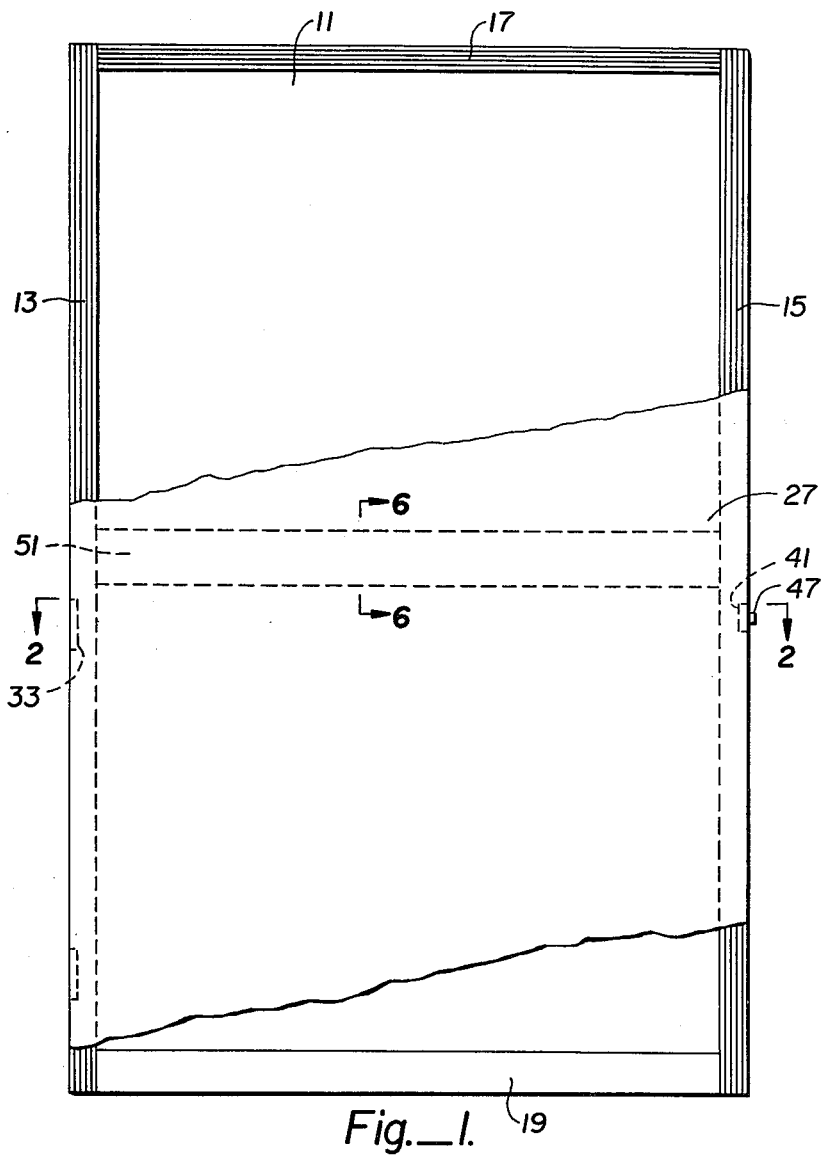
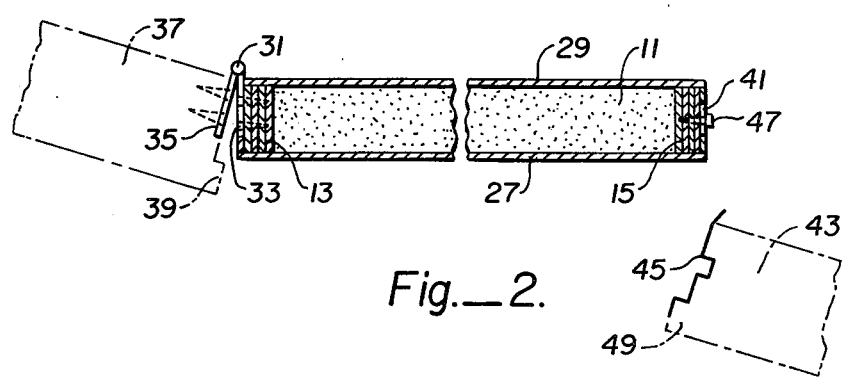

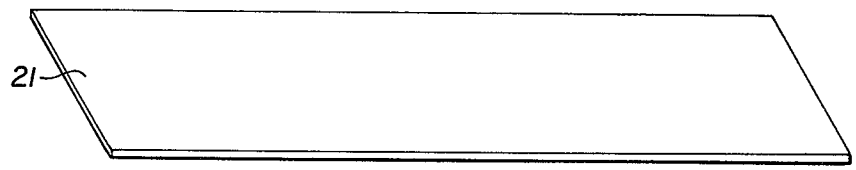
Fig._3a.
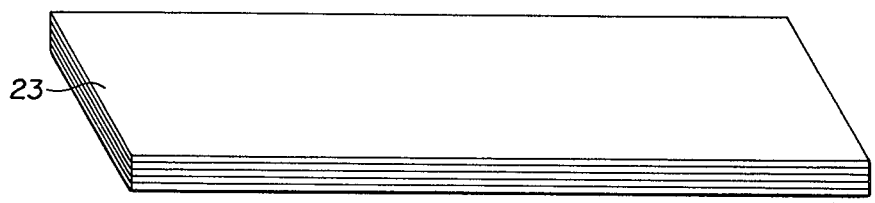
Fig._3b.
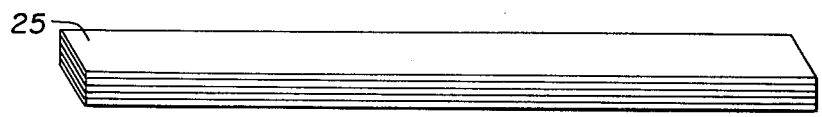
Fig._3c.
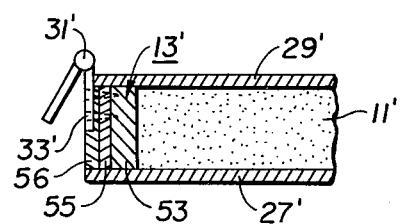
Fig._4.

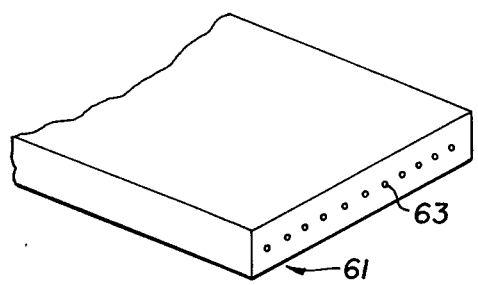
Fig._5a.
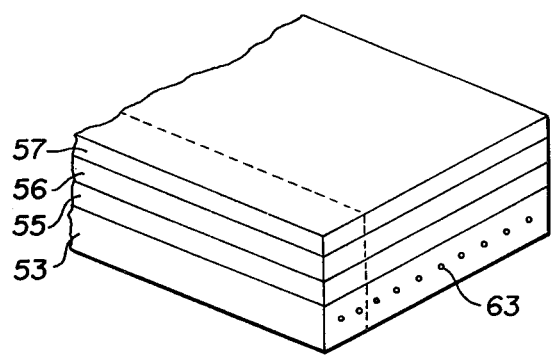
Fig._5b.
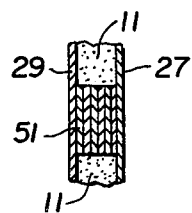
Fig._6a.
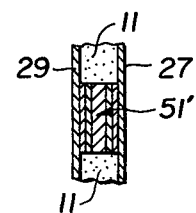
Fig._6b.
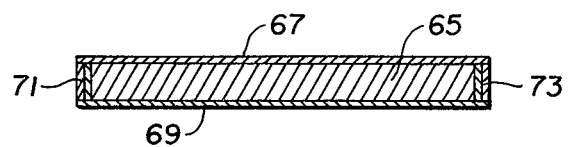
Fig._7.

FIRE-RESISTANT COMPOSITE WOOD STRUCTURE PARTICULARLY ADAPTED FOR USE IN FIRE DOORS

CROSS-REFERENCE TO RELATED PATENT

This is a continuation-in-part of application Ser. No. 800,785, filed May 26, 1977, now U.S. Pat. No. 4,104,828, issued Aug. 8, 1978.

BACKGROUND OF THE INVENTION

This invention relates to composite wood materials especially adapted for use in a solid board, such as a door, and more specifically to a fire rated door formed of a solid core and wooden strips attached around its edges.

Typical present solid flush door construction includes three basic components: a core, wood edges attached around the core (the vertical edges being referred to as stiles and the horizontal edges as rails), and thin facing material covering both sides of the door for its appearance. A principal factor taken into account in choosing the materials for the core and the wooden edges, and also for determining the thickness of the wooden edges, is the fire rating desired for the door. Building codes require that doors to be installed in certain building positions need to have a particular fire rating that is measured in time, such as a 20-minute door, or a 45-minute, one-hour or one and one-half hour door. Doors are given a fire rating in accordance with a standard test specification. A leading test is ASTM E-152(1976). Others are UL 10(b) (1974), NFPA 252(1972) and UBC 43-2(1973), all similar to the ASTM test. In conducting such tests, doors are mounted in an opening of a fireproof wall and then exposed on one side to a predetermined time-temperature rise function. The time that a door can withstand the heat before it is penetrated by burning determines its fire rating.

Fire door core materials commonly used at the present time include untreated wood or particle board for doors of a low fire rating, such as 20 minutes, or a particle board treated with a fire retardant, or a mineral core for doors of the higher fire rating, such as 45 minutes or more. A mineral door core is presently commercially available from the Gypsum Division of the Georgia-Pacific Corporation for use in doors rated up to one and one-half hours.

Wood stiles and rails (edges) are held tightly against the core edges, in order to provide edges that will hold wood screws used by the purchaser of the door to mount normal hardware thereon, such as hinges and door latching mechanisms. Presently available doors with ratings of 45 minutes or greater utilize solid wood stiles and rails that have been treated with a fire retardant, often in a salt form. Hemlock and maple are popularly utilized wood species for door stiles and rails. As the desired fire rating of the door goes up to 45 minutes or more, the stiles and rails must be made very narrow. The reason for this is that such fire retardant treated solid wood material cannot withstand the heat of a standard fire test for such long periods of time without being penetrated by burning. Therefore, the stiles and top rail are made to be as narrow as the door stop on a frame on which the door is to be mounted during the fire test. The standard fire tests identified above test for fire penetration during the test period of only the door portion between door stops. That is, fire penetration of the door edges behind the door stops does not disqualify the door; it passes the test anyway because no fire penetration is visible. The door core is made to overlap the door stops. Typical dimensions for a one and one-half hour rated door are stiles of ⅝ inch wide, a top rail of ½ inch wide and a bottom rail of 1½ inches wide before installation.

Such a narrow stile, necessitated by the desired fire rating of the door, has low resistance to splitting along its grain and a low ability to hold wood screws. The core material provides no screw holding power. Commercially available doors of all types are listed in manufacturers' product catalogs accumulated in "Sweet's Catalog File: Architectural Products for General Building," Volume 5, Section 8.3 (1977), published by the McGraw-Hill Information Systems Company and widely used by architects.

It is a principal object of the present invention to provide an improved solid board, such as a door, having a high fire rating, but with more substantial wooden edges for better resisting wood screw withdrawal and splitting than present doors of an equivalent fire rating.

SUMMARY OF THE INVENTION

This and additional objects are accomplished by the present invention, briefly summarized, wherein the door edges, particularly the stiles, are made of laminated strips of solid pressed wood fibrous sheet material having a fire retardant additive therein. The stiles are installed in the door with the surfaces between the laminated sheets of material held parallel to its core edge surfaces in order to maximize screw holding ability and split resistance. The laminations of the rails, on the other hand, may be oriented either parallel or perpendicular to the core edge depending on the direction of screw attachments.

The principal advantage of such door construction is that for a given door core material, the stiles and rails (edges) may be made thicker than existing solid wood edges so that hardware may be more securely attached, even after allowing for some trimming of the edge thickness on the site by the person installing the door, all while maintaining a high fire rating of the overall door construction of 45 minutes or more. Sheet material of the type utilized for the edges of the improved door construction is commercially available, its intended purpose being to prevent flame spread along the surface of the material when installed as wall paneling in buildings and mobile homes. But it has been found that such material has improved fire penetration characteristics as well and is advantageously utilized for fire door edges. Although there is presently considerable development effort going into improving fire door cores, no attention has been directed toward improving the wood door edges because, it is believed, that presently used fire retardant salt treated solid wood edges is all that can be done with the prospect of any significant improvement not existing.

It has also been found that the screw holding power of the improved door edges is extremely good relative to that of the fire retardant salt treated solid wood, even though the holding power of a single sheet of such pressed wood material is inferior. Salt treated wood has a further disadvantage of having density variations which make its screw holding ability and salt fire retardant content vary throughout the wood. Thus, door hardware is securely attached to uniform density door edges made of the material according to the present invention.

A further improvement for many applications including door construction is a composite wood structure that combines one or more strips of pressed wood fibrous sheets discussed above with a thicker layer of wood material formed from a mixture of wood chips, ground bark and fire-retardant chemicals. Such a composite structure maintains the advantage discussed above and has a further advantage of permitting thicker wood door edges while at the same time increasing the resistance of the door edge to fire penetration, all at a reasonable cost.

Additional objects, advantages and features of the present invention are described with respect to a preferred fire door construction embodiment thereof, which description should be taken in conjunction with the accompanying drawings.

BRIEF DESCRIPTION OF THE DRAWINGS

FIG. 1 shows a door, its facing partially cut away, having a construction according to the present invention;

FIG. 2 is a cross-sectional view of the door of FIG. 1, taken at section 2—2 thereof;

FIGS. 3a, 3b and 3c illustrate the steps of manufacturing the edges of the door of FIGS. 1 and 2;

FIG. 4 is a cross-sectional view of a variation of the door of FIG. 1 taken at section 2—2 thereof;

FIG. 5a and 5b illustrate the steps of manufacturing the door edge of FIG. 4;

FIG. 6a is a cross-sectional view of an optional door crossbar, as viewed at section 6—6 of FIG. 1, and FIG. 6b is another specific form of the same optional door crossbar; and FIG. 7 is a horizontal cross-section through a door having a construction that varies in certain particulars from those illustrated in other Figures.

DESCRIPTION OF A PREFERRED EMBODIMENT

A preferred structure having maximum advantage that utilizes the various aspects of the present invention is a fire door such as illustrated in FIGS. 1 and 2. Such a fire door comprises three main components. Most of the door is formed of a core material 11 in a rectangular shape, the first component. Of course, for unusual shaped doors, the core material 11 would take on some other shape. The core 11 is usually of a uniform thickness, although it does not have to be for special effects, and has its major opposing surface areas terminate in edges which are themselves planar and perpendicular to the major surface planes of the core 11.

The core 11 may be one continuous, homogeneous piece throughout, or it may consist of a plurality of pieces, as small as one foot or so square, arranged to fill the entire core area within the door. A preferred core material for a high fire rating door is a preformed homogeneous mineral slab made up of a combination of fiber glass, gypsum, calcium silicate and other fire resistive materials. Such a core is one manufactured by the Georgia-Pacific Company and referenced herein before. Alternatively, the core may be formed of a combination of wood particles, fire resistive or retardant additives, and adhesive, preformed into slabs. Mineral cores or fire-retardant treated particle board are generally used for the higher fire rating doors, such as 45 minute and one-hour doors, while untreated wood product cores are generally used for fire doors of lesser ratings, such as those having a 20 minute fire rating. Of course, other core materials are suitable so long as they are solid and have equivalent fire resistive characteristics.

The second main door component is its edges. Wood edges are attached by an appropriate adhesive to the four edges of the core 11 in the form of stiles 13 and 15, top rail 17 and bottom rail 19. Solid wood edges are generally used in existing doors to permit trimming the sides of the door on the construction site during the installation of the door and also to provide a material for holding door hardware by means of screws. But the material utilized in the door of FIGS. 1 and 2 is different than that of present solid wood, fire retardant impregnated door edges. The stiles 13 and 15 and the top rail 17 are preferably constructed, according to an improvement of the present invention, of a plurality of laminated sheets of uniformly thick pressed wood fiber material having a non-salt fire retardant added thereto during its manufacture.

Wood fiber sheets are formed, as is generally known, by subjecting wood chips to either pressurized steam or a chemical bath to break the wood down into its individual fibers in the form of a wet slurry. This wet slurry is then reformed by spreading onto an open screened surface mat where it is subjected to pressure and heat. A natural chemical component of wood then flows to hold the wood fibers together in its new form. A fire retardant material is conveniently added during the manufacturing process while the fibers are still in a wet slurry in a manner to result in the material being dispersed throughout the resulting wood product substantially uniformly. The fire retardant material may alternately be impregnated into the individual fibers themselves. An aluminum compound, such as alumina, aluminum hydroxide or aluminum silicate is a common fire retardant. Boron compounds are also known fire retardants and can be utilized.

A commercially available wood fiber board that is satisfactory for this application is one sold under a "Flame Test" panel brand by the Masonite Corporation. This material is obtained in wall panel sheets of typical thickness of 0.245 inch, with a specific gravity typically of 1.10, and includes an aluminum compound as a fire retardant in the proportion of approximately 35% of its weight. Although this material is designed to prevent flame spread along the surface of wood paneling in order to meet new mobile home fire retardant standards, it has also been found to be a good material to prevent fire penetration.

The stiles 13 and 15 and top rail 17 are preferably made with such commercially available material in a manner illustrated in FIG. 3. A number of sheets of the wood pressed fiber material, such as the sheet 21, are glued together to form a composite structure 23. Each of the sheets is of substantially a uniform thickness, is flat and is of a uniform density. They are sanded or planed on each side to provide smooth surfaces to receive adhesive. Up to seven layers of nominally ¼ inch thick sheet material are glued together depending upon how wide the door edges are to be, five sheets being illustrated herein for a typical fire door application. The edges 13, 15 and 17 of FIG. 1 are thus approximately 1¼ inch wide. This is in excess of the width of the typical door jamb stop for which the door is designed to be used.

In forming the composite pressed wood material 23, every other layer receives an application of wet glue on each side. The alternate pieces are dry. The layers are then built up by alternately laying down dry and wet glued pieces until the desired number of layers are in the uncured board. The combination is then subjected in a press to pressure for a time until the glue is cured. After the adhesive cure becomes complete the individual cured laminated boards 23 (FIG. 3), are cut into narrow strips, such as the strip 25, for installation as a stile or rail (edge) as part of a finished door.

The edge material 25 (FIG. 3) is installed on the edge of the core 11 of the door of the type illustrated in FIG. 1 in a manner that the glued together surfaces are parallel to the edge surface of the core 11 to which it may be attached by an appropriate adhesive. This orientation provides the maximum screw holding surface at the edge of the finished door. The fire retardant capabilities of the wood edges made according to this technique depend upon the thickness of the edge, usually the same as the uniform thickness of the core material 11, and the amount of and type of fire retardant that has been added to the pressed fiberboard during its manufacture. A door is given a fire rating according to standard tests by subjecting the door to a flame according to a predetermined time-temperature curve for a predetermined time period, such as 45 minutes, 1 hour or 1½ hours. If there are holes either at the core or around the edge material, the door has failed the test. A 45 minute or 1 hour rating according to such tests has been obtained with the aforementioned Masonite material that is formed of five layers in width before trimming during the manufacturing processes and a thickness of 1½ inches to match the mineral core thickness. The use of an aluminum compound as a fire retardant in an amount in excess of about 30% of the weight of pressed fibrous material having an overall specific gravity of about 1.10 appears to be satisfactory for such doors.

The bottom rail 19 may be of the same laminated material but it is not as critical since the bottom of a door does not receive the same intense heat either in the fire tests or in an actual fire as does the top rail 17 or the upper portions of the stiles 13 and 15. If the laminated sheet pressed wood fiber material is not utilized for the bottom rail 19, a standard solid wood with a fire retardant impregnated therein is utilized.

The third major component of the door being described is a facing material illustrated as face sheets 27 and 29. These sheets are attached to the core 11 and the continuous surface thereof formed by the edges 13, 15, 17 and 19 by an adhesive under pressure. The face sheets 27 and 29 are typically only ⅛ inch thick to form a composite door having an overall thickness of 1¾ inch when used with typical edge and core thicknesses of 1½ inch. The facing sheets 27 and 29 provide an overall covering of the door faces for good aesthetics and for securing core components in a sandwich construction.

Pressed fiberboard characteristically resists splitting because it does not have a grain; rather, the wood fibers are oriented in a random manner rather than being aligned to form a grain as is the case in natural solid wood. But since the fiberboard can be made to have a density greater than that of wood, there is the advantage, if the specific gravity of fiber-board is in excess of 0.80, that the laminated formed door edges have a screw holding power significantly in excess of that of ordinary solid wood that is presently being used for door edges.

Referring to FIG. 2, a full mortise hinge 31 is schematically illustrated having one leaf 33 attached to a door edge according to the present invention with screws shown in dotted outline in accordance with normal techniques. A second leaf 35 of the hinge 31 is attached by screws shown in dotted outline to a door jamb that is part of a wall 37, the door jamb including a door stop 39 as well. The stile 15 is also shown schematically with a standard lock front 41 (part of a full lock set, the remaining elements not being shown), held to the stile 15 by a screw shown in dotted outline. A wall 43 includes a strike plate 45 attached to the door jamb for accepting a lock bolt 47. The door jamb on the wall 43 also has a door stop 49. Because the stiles 13 and 15 can be made thicker with the improved construction of the present invention than are stiles of presently available fire doors of long fire rating, there is plenty of edge wood to hold adequately sized wood screws along with the hardware attached to the door, even after the door is trimmed somewhat and the hardware mortised (recessed) into the wood edge according to common practice. Other hardware may be attached as desired.

The reason why the stiles and top rail of present doors are of a long fire rating, such as 45 minute or one-hour doors, are made so thin, generally ¾ inch or less, can be seen from FIG. 2. In order to pass the standard fire rating tests conducted with a door hung in a typical manner, the wood edges, because they cannot resist penetration by the heat and fire for the rated length of time, must be hidden behind the door stops 39 and 49. That is, the core material 11 that has the required fire rating is caused to overlap the door stops by making the wood edges extremely thin. The door constructed according to the present invention, on the other hand, need not rely upon the door stops for fire retardant properties, and thus the core material 11 does not need to extend so far as to overlap the door jambs. The thicker stiles and rails permit more material for secure wood screw holding and give greater flexibility to those installing the doors by having excess material which may be removed from the edge for exact on-site fitting of the door to a particular application.

Referring to FIG. 4, a modified door structure is illustrated at the same sectional view as given in FIG. 2. The reference numbers of FIG. 4 are the same as corresponding numbers of the previously described door of FIGS. 1 and 2 except that a prime (') is added. The main difference is that a hinge carrying stile 13' of FIG. 4 is of a somewhat different construction than the stile 13 of FIGS. 1 and 2.

The stile 13' of FIG. 4 is made of a board 53 that is rectangular in cross-section and adhered to the edge of the core material 11'. The board 53 is constructed from a slurry of wood chips and ground up wood bark along with fire-retardant chemicals, as described in detail hereinafter. Attached to a face of the board 53 opposite to that adhered to the core 11' are two layers 55 and 56 of pressed fiber board sheet material of a type described hereinabove with respect to the door embodiments of FIGS. 1–3. The particular combination of materials in the arrangement shown in FIG. 4 provides a door stile that has extremely high screw holding capability, is thick to accept long screws or allow for easy trimming and is extremely resistant to penetration by fire. The stile structure of FIG. 4 has satisfactorily been employed in a door that has passed the one and one-half hour fire rating test. Although the hinge carrying stile is most advantageously constructed as shown in FIG. 4 for a long fire rating door, the opposite stile and rails may also be so constructed. Various arrangements of the board 53 and sheet material 55 and 56 can be employed other than that specifically shown in FIG. 4, such as utilizing only a single one of the sheets 55 or 56 on the outside of the door edge, utilizing more than two such sheets, or otherwise facing the board 53 with such sheets on its other edges.

Referring to FIGS. 5(a) and 5(b), the construction of the stile of FIG. 4 will be described. A block of material 61 is formed to have a resulting thickness equal to that desired for the board 53 between the edge of the core 11' and the layer 55. Typically, this might be one-half inch. The width of the board 61 is made to be some convenient multiple of the thickness of the door core 11' and maybe in the range of one foot wide or so. Its length is made somewhat longer than the length of the doors for which the resulting material is to be used, and may be conveniently made to be seven feet long. The board 61 is made from a slurry mixture of wood chips and fire-retardant chemicals, according to the following formulation with proportional parts given:

(1) 159 grams of a "salt" solution made of approximately 1.327 parts of magnesium chloride hexahydrate to one part of water.
(2) 100 grams of magnesium oxide.
(3) 20 grams of pine wood flakes (sawdust) of approximately No. 6 mesh screen size (approximately 1/8 inch diameter).
(4) 60 grams of fir bark ground into needle shaped particles of the following size mixture;
  (a) No. 65 mesh screen, 45% plus or minus 10%.
  (b) No. 100 mesh screen, 35% plus or minus 10%.
  (c) No. 200 mesh screen, 20% plus or minus 10%.

The above materials are mixed for a few minutes until thoroughly mixed and at the proper consistency. Mixing must be stopped before the resulting solution becomes too fluid for subsequent forming. After mixing, the liquid material is poured into a form having a cavity the shape of the desired resulting board 65 but with sides that are considerably higher. The cavity is initially filled about halfway and pressed down to make sure that the material fits into all of the corners and otherwise fills the bottom of the cavity mold. Several fibers 63 are then laid along the length of the cavity on top of the material, these fibers preferably being commercially available fiberglass. The purpose of the fibers 63 is to increase flexural strength to the resulting board 61 so that it can be carried and handled without the board breaking. After the fibers 63 are in place, the mold is filled up with more of the wood chip and fire-retardant chemical solution.

A board is then placed on top of the solution within the sides of the cavity mold and is pressed downward on to the solution to drive out excess water and compress the material to form the board 61 of the desired height as shown in FIG. 5(a). The board is then permitted to dry, first within the mold cavity and then for a time after being removed. The board 61 is dried in its last step by placing in a curing oven for several days.

Once the board 61 is completed and dried in this manner, three layers 55, 56 and 57 of the fire-retardant fiber-board sheets discussed with respect to the embodiments of FIGS. 1–3 are then glued onto one side of the board 61 as shown in FIG. 5(b). The resulting structure is then cut with normal woodworking tools along the dotted lines of FIG. 5(b) to provide the composite stile 13' that is shown in FIG. 4. Substantially all of the layer 57 is trimmed from the rough constructed door before shipment. Of course for other specific combinations and arrangements of the board 61 and fire-retardant fiberboard, the desired materials are glued together in the different configurations.

In some applications, it is desired that a door have a wooden strip across its width, such as the strip 51 shown in dotted outline in FIG. 1. Commercially available door core materials generally have little mechanical strength, so such a cross-piece 51 can be utilized to add strength to such a door if it is necessary for a particular door installation. Also, additional pieces of wood (not shown) can be included in place of standard core material within the door for very specific purposes, such as wood blocks adjacent the stiles in which door hardware may be installed.

Of course, such added wood members within the door core must have a sufficient resistance to fire penetration in order to qualify the door for a desired fire rating time. Therefore, one of the two composite structures described above for the door stiles may be utilized. FIG. 6(a) shows the structure of the cross-member 51 to be made of a plurality of fire-resistant fiberboard sheets glued together in a manner discussed with respect to FIG. 3. Alternatively, such fiberboard sheets may be combined with a core material made from a board 61 as described with respect to FIG. 5(a), such a combination being shown as cross-bar 51' in FIG. 6(b).

Referring to FIG. 7, a cross-sectional view of the door according to another construction is shown wherein a core 65 is made entirely in accordance with the process described with respect to FIG. 5(a). Sheets 67 and 69 are glued to opposite sides of the core 65 and may be made from the fireproof fiberboard material described with respect to the embodiments of FIGS. 1–3. In any event, the sheet material 67 and 69 will be formed with the appropriate decorative finish on the outside thereof. Around the edges of the core 65 are attached by gluing two layers of the fireproof fiberboard material, thus forming stiles 71 and 73 in the embodiment of the door shown in FIG. 7.

Although the various aspects of the present invention have been described with respect to particular composite wood material and fire door construction as preferred embodiments, it will be understood that the invention is entitled to protection within the full scope of the appended claims.

We claim:

1. A fire-resistant wood based structural material comprising:
  a first layer of material being formed from a slurry mixture of wood chips, ground bark and a fire-retardant chemical that is formed into a board by pressure and drying,
  a second layer of material being formed from a slurry mixture of individual wood fibers and a fire-retardant chemical that is formed into a board by heat and pressure, said first and second material layers being firmly adhered to each other in their dry states, thereby forming a composite structural material,
  a third layer of material of the same type and substantially the same thickness as said second layer, said third layer is firmly adhered to said second layer on a side opposite from that adhered to said first layer.

2. The structural material according to claim 1 wherein said first layer has a thickness of at least several times the thickness of said second layer.

3. A fire rated door, comprising:
  a rectangularly-shaped piece of core sheet material having a substantially uniform thickness and edges on all four sides thereof that are planar and perpendicular to major planar surfaces of said core, and composite wood strips attached to at least the opposing edges of said core that are of the longest length, the thickness of said strips being substantially the same as the thickness of the core material, at least one of said strips being formed of a plurality of layers of material, a first layer of material adhered to an edged surface of the core and a second layer of material being adhered to said first layer of material on an opposite side thereof from said core, said first layer of material being thicker than said second layer and being formed from a slurry mixture of wood chips, ground bark and a fire-retardant chemical that is formed into a board by pressure and drying, said second layer of material being formed from a slurry mixture of individual wood fibers and a fire-retardant chemical that is formed into a board by heat and pressure.

4. The fire rated door according to claim 3 wherein the thickness of the core material and its composition, and the thickness of the composite wood edge along said one edge of said core material along with its fire-retardant characteristics are selected to have a fire rating of one and one-half hours or more.

5. The fire rated door according to claim 3 mounted with said composite wood edge along said one edge of core material being hingedly attached to a door jamb, said jamb including a door stop positioned to be held against said composite wood edge when the door is closed, said door stop having a thickness that is significantly thinner than the combined thickness of said first and second layers of said composite door edge taken in a direction away from the core edge.

6. The fire rated door according to claim 3 which additionally comprises a composite wood strip extending across the width of the door and dividing said core sheet material into separate upper and lower portions, said composite cross strip having a center board with the same characteristics as first door edge layer with boards adhered on either side thereof to form a smooth surface with opposing surfaces of said core material and that have the same characteristics as said second layer on said composite door edge.

7. The fire rated door according to any of claims 3, 4, 5 or 6 which additionally comprises facing sheet material attached to the major planar surfaces of said core material as extended by said composite wood edge, thereby to form continuous aesthetically pleasing surfaces on either side.

8. The fire rated door according to any of claims 3, 4, 5 or 6 wherein said core material consists essentially of a solid mineral material.

9. The fire rated door according to any of claims 3, 4, 5 or 6 wherein said composite material door edge comprises a third layer of material adhered to said second layer of material on a side opposite to that which is adhered to said first layer.

* * * * *